United States Patent [19]

Leistritz

[11] 4,233,812
[45] Nov. 18, 1980

[54] GAS DISCHARGE APPARATUS

[76] Inventor: Hans K. Leistritz, Stegwiesen 8, D 7891 Kussaberg 2, Fed. Rep. of Germany

[21] Appl. No.: 900,247

[22] Filed: Apr. 26, 1978

[30] Foreign Application Priority Data

| Apr. 28, 1977 | [DE] | Fed. Rep. of Germany | 2718944 |
| May 2, 1977 | [DE] | Fed. Rep. of Germany | 2719513 |
| May 3, 1977 | [DE] | Fed. Rep. of Germany | 2719634 |
| May 7, 1977 | [DE] | Fed. Rep. of Germany | 2720558 |
| May 14, 1977 | [DE] | Fed. Rep. of Germany | 2721956 |
| May 18, 1977 | [DE] | Fed. Rep. of Germany | 2722422 |
| Jun. 21, 1977 | [DE] | Fed. Rep. of Germany | 2727728 |
| Jul. 2, 1977 | [DE] | Fed. Rep. of Germany | 2730007 |
| Jul. 6, 1977 | [DE] | Fed. Rep. of Germany | 2730480 |
| Jul. 25, 1977 | [DE] | Fed. Rep. of Germany | 2733443 |
| Oct. 24, 1977 | [DE] | Fed. Rep. of Germany | 2747655 |
| Oct. 26, 1977 | [DE] | Fed. Rep. of Germany | 2747959 |

[51] Int. Cl.³ .................. F01N 3/02; F02M 35/00; F01N 1/08; F28D 7/10
[52] U.S. Cl. .................. 60/320; 181/229; 181/265; 165/142; 165/154; 165/183
[58] Field of Search .................. 60/320, 321, 298; 181/229, 265; 165/142, 154, 183

[56] References Cited

U.S. PATENT DOCUMENTS

| 1,447,037 | 2/1923 | Rea | 181/265 |
| 1,514,441 | 11/1924 | Culp | 181/265 |
| 1,849,086 | 3/1932 | Hehr | 165/142 |
| 3,475,922 | 11/1969 | Scott | 165/183 |
| 3,642,094 | 2/1972 | Yancey | 181/265 |
| 3,835,645 | 9/1974 | Zoleta | 60/298 |

FOREIGN PATENT DOCUMENTS

| 961667 | 11/1949 | France | 181/265 |
| 1243325 | 8/1960 | France | 181/265 |
| 278547 | 10/1930 | Italy | 181/265 |
| 615674 | 1/1961 | Italy | 165/154 |
| 920397 | 3/1963 | United Kingdom | 181/265 |

*Primary Examiner*—Douglas Hart
*Attorney, Agent, or Firm*—Watson, Cole, Grindle & Watson

[57] ABSTRACT

A hollow finned, multipassage, aluminum or ceramic exhaust gas cooling device is clamped between an inlet structure and an outlet structure which provide for retroverted flow and muffling. The device may be air-cooled internally.

4 Claims, 30 Drawing Figures

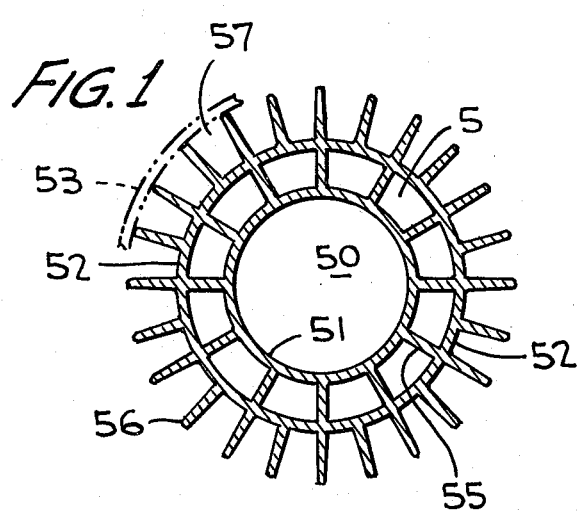
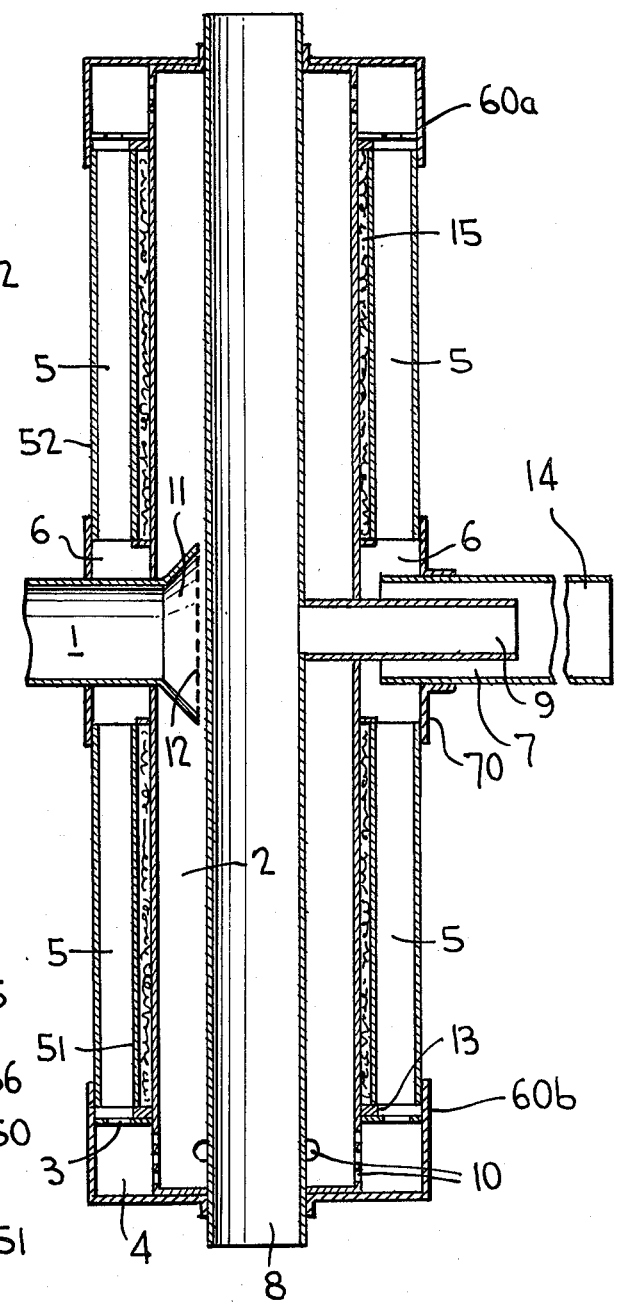
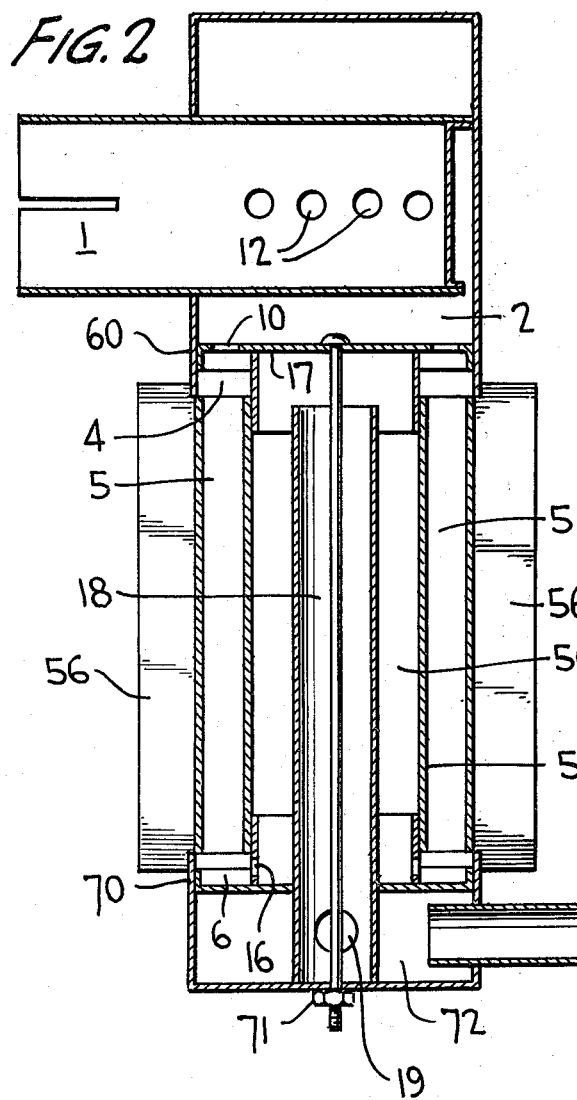

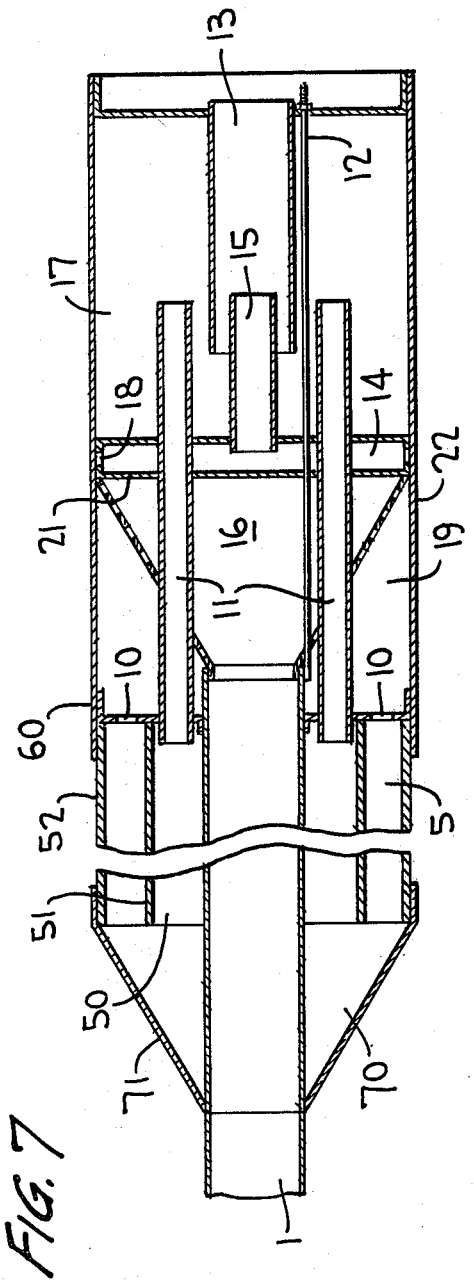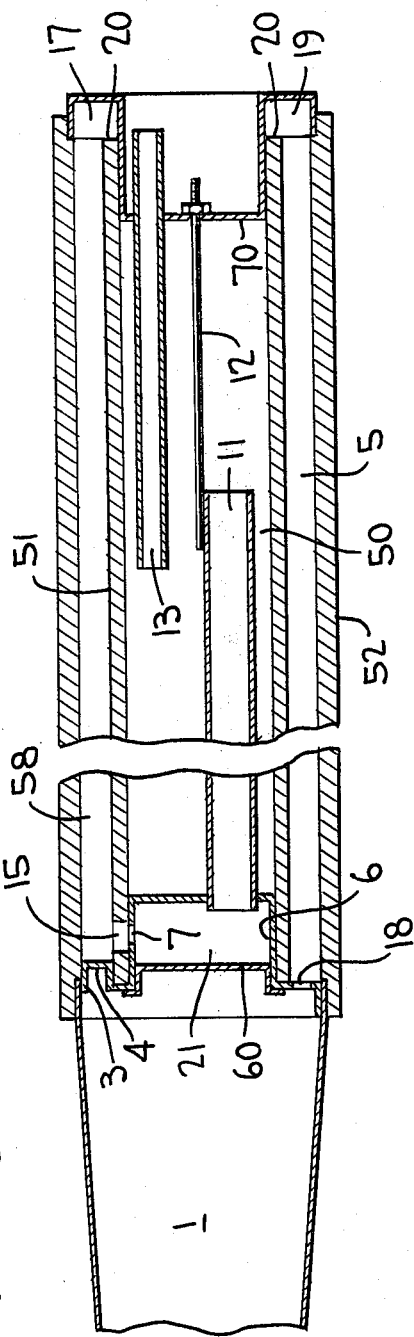
FIG. 7
FIG. 8

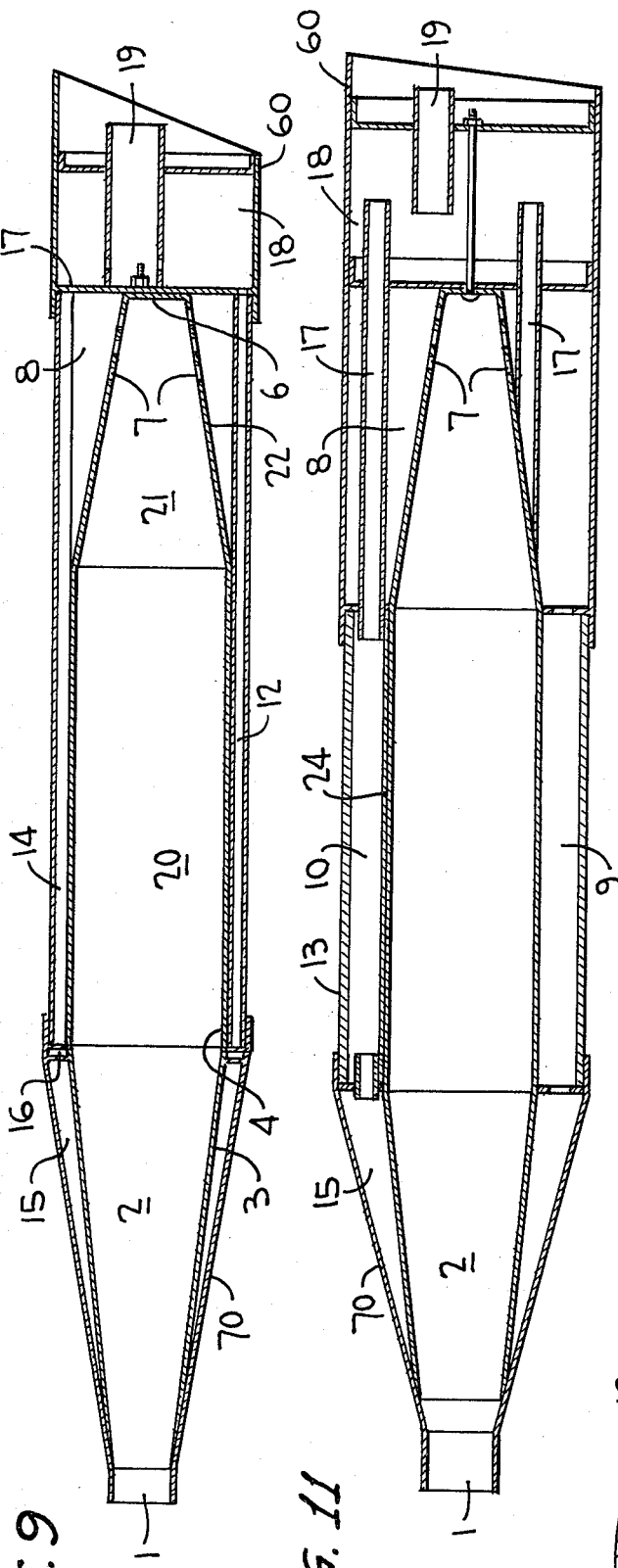
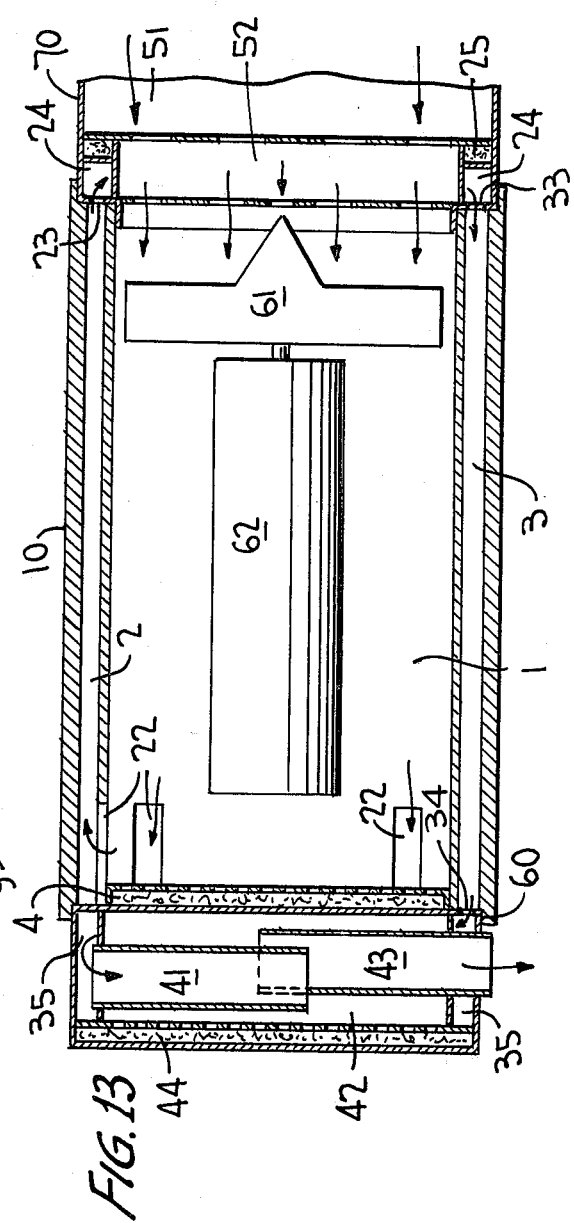

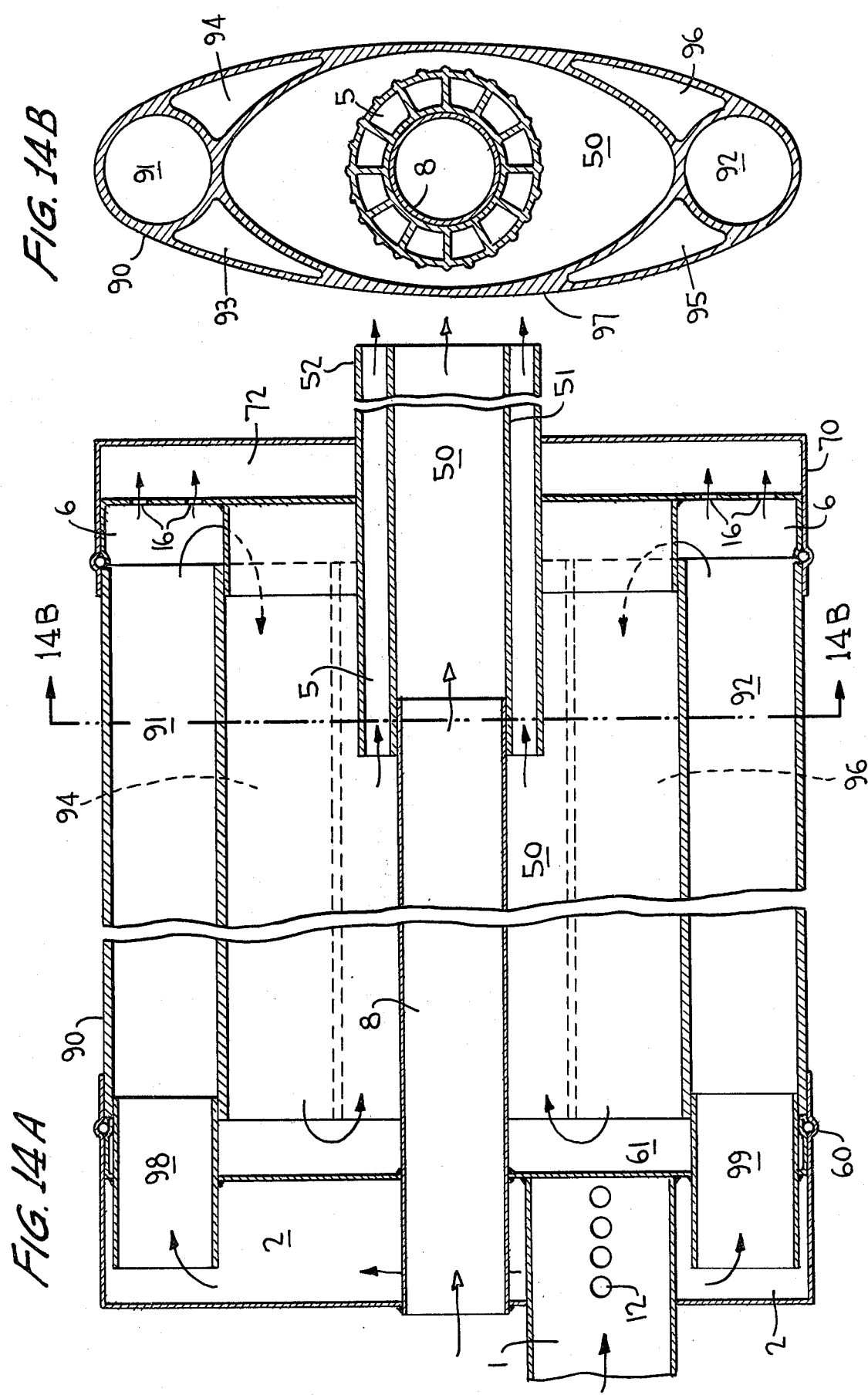

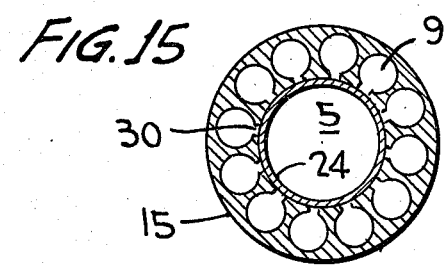
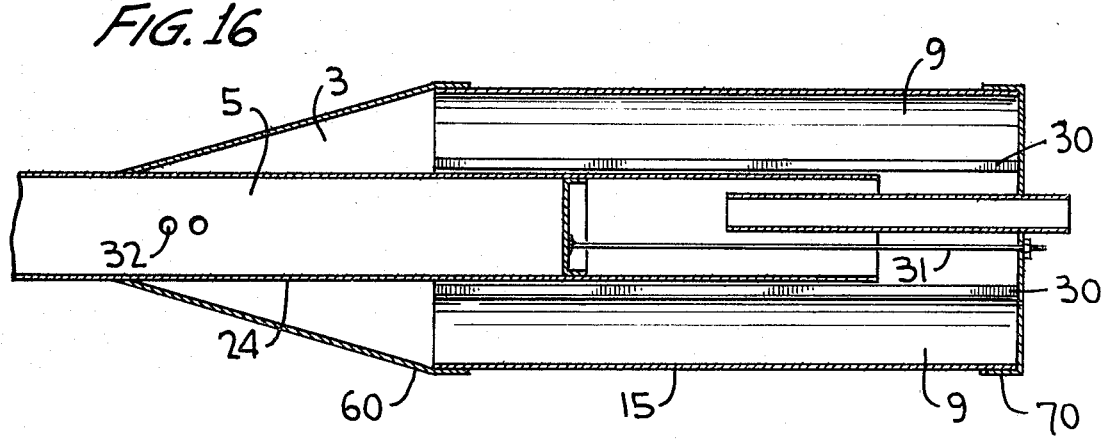
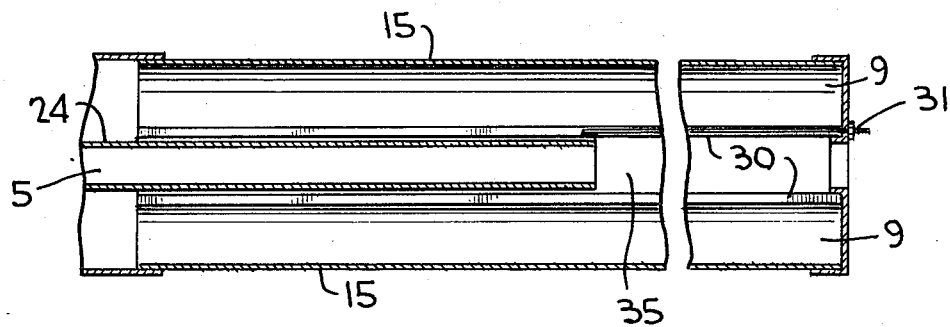
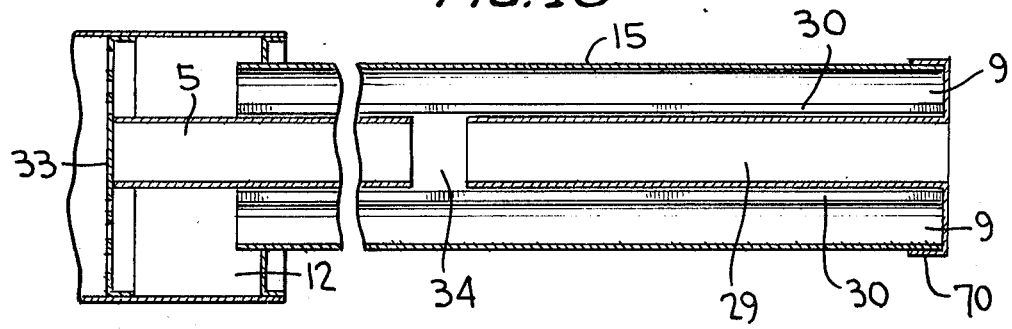

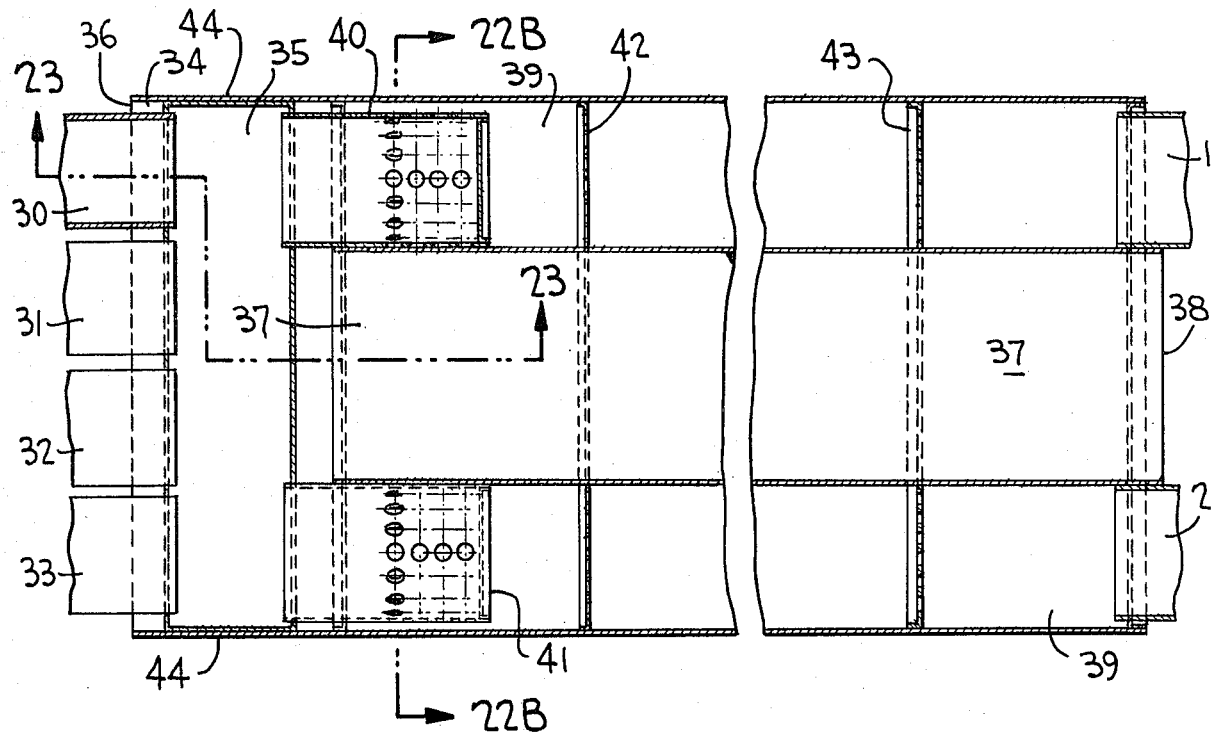
FIG. 22A
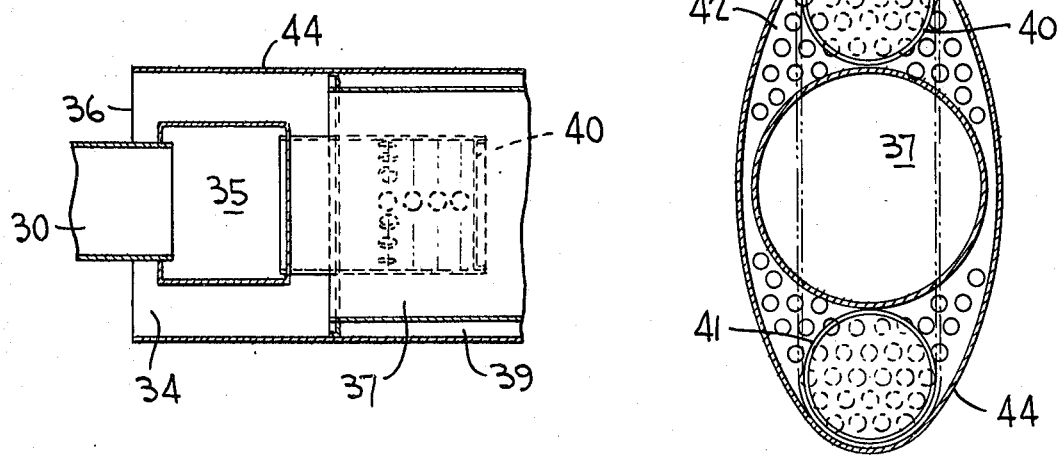
FIG. 23
FIG. 22B

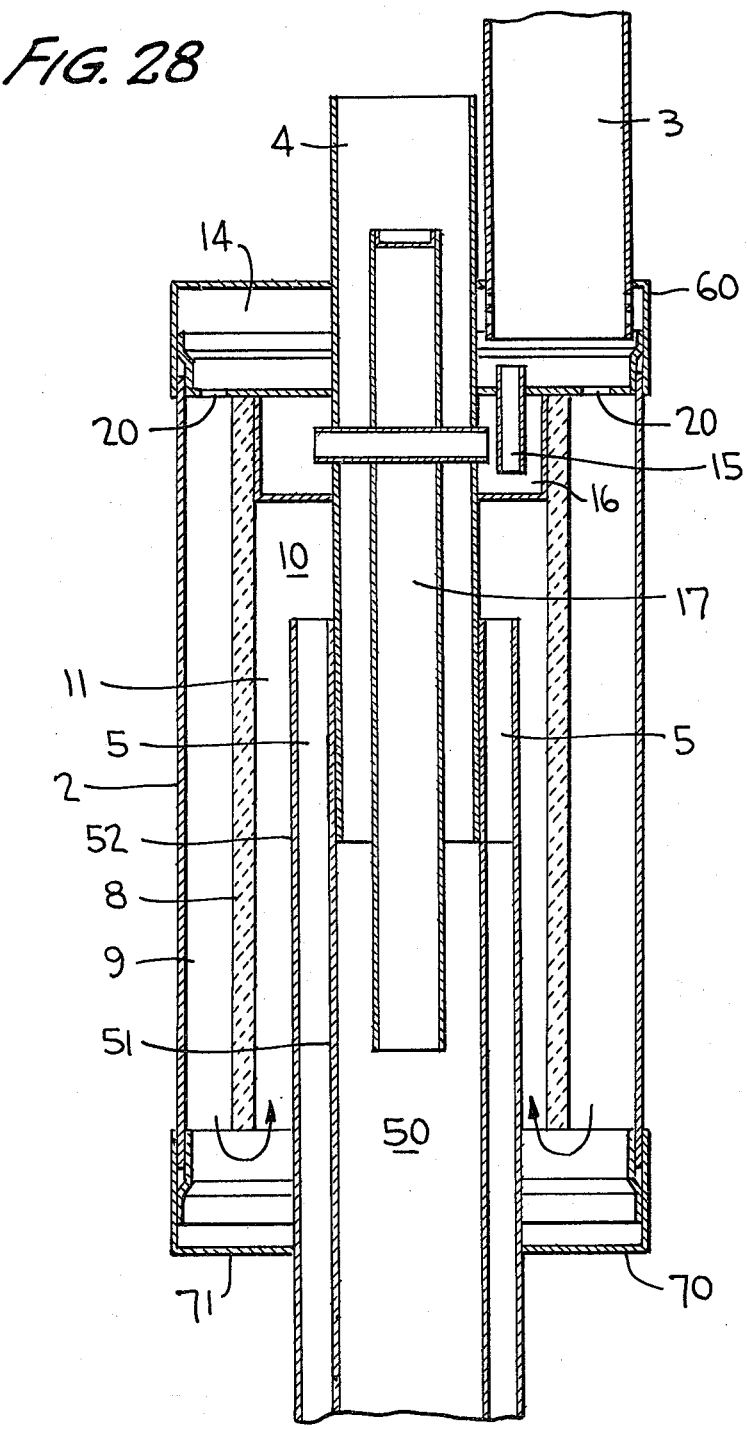

GAS DISCHARGE APPARATUS

BACKGROUND OF THE INVENTION

1. Field of the Invention

The invention relates to a guiding system for gas-throughput equipment with discharge to the free atmosphere, and more particularly to such systems used for motor drive elements.

2. Prior Art

Fabrication of such equipment from single-sheet steel, which is common in the trade, has numerous drawbacks consisting, on the one hand, in a great tendency toward corrosion and, on the other, in the high-wage manufacture of expansion chambers having long gas discharge channels as acoustical elements. Moreover, thin-walled sheet steel areas cause diaphragm effects and, thus, pass the accumulation of vibrations of their interior onto the environment as solid-bound sound. The change of materials from single-sheet steel to chromium steel was suitable for solving the corrosion problems, but not for the questions involving cost-effectiveness and sensitivity to vibrational stress. Only for very small internal combustion engines with very complex die-cast tools did the change to aluminum materials lead to limited solutions, because the thermal stability limit of this material continued to lead to permanent damages so that, for example, in the extensive field of automobile mufflers these experiments had to be deemed a failure. In particular, the dynamic stress on the internal chamber partitions, together with the increasing thermal load, led to destruction of the internal components, above all, of the acoustical elements. The change to ceramic materials led to similar permanent damages due to the brittleness of this material, in addition to the sensitivity to external impact stress. Thermostability problems exist even with these various materials, particularly with the simple ceramic materials which are of interest for this type of equipment, and also because of the sensitivity to dynamic stress directly on thin-walled ceramic areas.

SUMMARY OF THE INVENTION

Because aluminum and ceramics possess advantages that are inevitable in the long run due to their inexpensive workability in the highly competitive industrial extrusion process and to their low price and abundance, an object of the invention is to avoid the above drawbacks through a special construction concept. An important feature of the invention is that the housing, or an internal chamber of these types of throughput devices, is formed by a long hollow section without bulkheads open on both sides and having a single, double, or multiple shell wall. The hollow section is clamped into closing components which have the additional walls needed to form a three-dimensional structure and which arrange the whole gas-throughput in such a manner that thermal gradients occur through wall scavenging on the other side by a cooler medium either between the walls of the hollow section, or between the walls of the intake closing component with thermal flux to the exhaust closing component.

BRIEF DESCRIPTION OF THE FIGURES

FIG. 1 is a cross-section of a muffler for an industrial engine in accordance with the invention;

FIG. 2 shows an elevation view of a muffler in accordance with the invention;

FIG. 3 illustrates a modified embodiment of a muffler in accordance with the invention;

FIG. 7 shows a muffler suitable for 4-stroke motorcylce engines;

FIG. 8 shows a muffler suitable for 2-stroke motorcycle engines;

FIGS. 9 and 11 are other embodiments of a muffler in accordance with the invention;

FIG. 10 is a cross section of a branch-current assembly used in the muffler embodiment of FIG. 9 for eliminating solid bound sound;

FIG. 12 is a cross section of an outer shell for eliminating solid bound sound;

FIG. 13 illustrates an enclosed chamber housing an electric motor and air blower in a hollow section of a muffler;

FIG. 14a illustrates the basic construction of a terminal muffler for an automobile;

FIG. 14B is a section taken along lines 14B—14B of FIG. 14A;

FIG. 15 is a cross section of a closing component illustrating the formation of longitudinal overflow slots therein;

FIGS. 16–18 show respective embodiments of longitudinal slots formed in the hollow section walls of the internal channels of a gas discharge device;

FIG. 22A illustrates a longitudinal section of a gas discharge element;

FIG. 22B shows a cross section of an exhaust nozzle, taken on lines 22B of FIG. 22A;

FIG. 23 shows an arrangement of a cooling line associated with a fan pipe type arrangement;

FIG. 28 shows a modified embodiment of a thermal short-circuit system.

DETAILED DESCRIPTION

Figure 20:
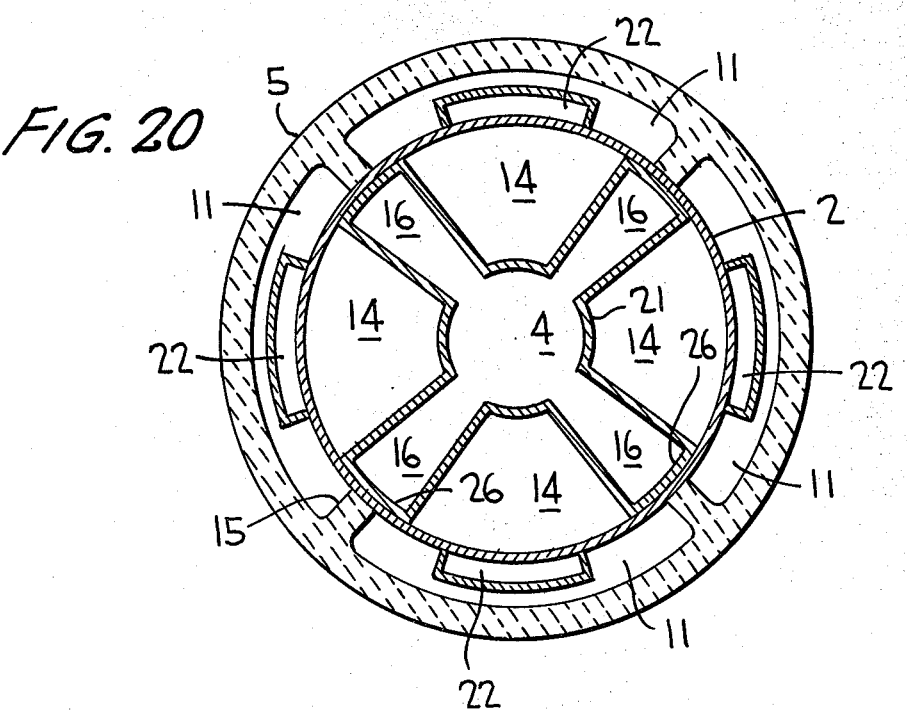
FIG. 20 is a cross section of a multiple internal cooling pipe arrangement showing surface enlargement of the cooling pipes.

The hollow section may be fabricated as a uniform molding, as illustrated in FIGS. 1, 10, 12, in the two sectional views of the hollow section in FIG. 14, and in FIG. 15. However, it can also be made by the composite-casting process resulting in the muffler cross-section shown in FIG. 4. In that embodiment, a single-wall hollow section is provided with internal fins 3 and external fins 4 arranged on the enclosing wall 8, thereby creating the channels 9 (cf. FIGS. 5 and 6) of the annular shell space through a tubular wall 15, into which the molding 8 is formed. Channels 10 are formed through a tubular wall portion which at the same time forms a special internal chamber 13. The embodiment of FIG. 20 expands this notion by dovetailing the most widely differing types of hollow sections. Various materials may be combined, depending on their suitability. As shown by the broken-line outer wall portion 53 in FIG. 1, any aggregation of fins 55, 56 of subdivided shell spaces with channel assemblies 5, 57 surrounding an internal chamber 50 is possible.

The formation of closing components is to be distinguished from the above described formation of hollow sections, with reference to FIGS. 1 and 2 showing a muffler of an industrial engine. The hollow section with the shell-space channels 5 and the fins 56 (FIG. 1) is clamped into the two closing components 60 and 70 by use of a screw pipe joint 71. The closing component 60 has the exhaust-gas intake channel 1 with apertures 12, an expansion chamber 2, an aperture 10 in wall 17, through which the burned gas is passed and introduced into an intake chamber 4, the enclosing walls of which bear directly against the hollow section. The inner walls of intake chamber 4 penetrate fairly deeply into the internal chamber 50 of the hollow section. The outer wall of intake chamber 4 engages in a groove-shaped depression of wall 52. After traversing the hollow-section channels 5 situated in an externally finned aluminum extruded piece, the exhaust gas flowing into the chamber 4 is passed with heat loss to the intake chamber 6 of the closing component 70, dissipating additional heat to the walls thereof. In this way, a thermal gradient develops within the aluminum wall 51 in the direction of the internal chamber 50, in particular in the vicinity of the closing component 60. Apart from acoustical considerations, the initiation of this thermal gradient is one of the essential characteristics of the counterflow line of the gas-throughput apparatus. Moreover, there is an additional heat-exchange path after the combustion product has traversed the internal chamber 50 of the hollow section following the passage through the orifices 16. The additional path flows along the nonperforated portion of the wall 17 of the closing component 60. Wall 17 is exposed on the other side from the chamber 2 by hot burned engine gas, and dissipates heat from there also, which heat flows directly through the tube 18 and outlet 19 therein to exhaust expansion chamber 72, and in turn to the outlet tube 73 without thermally loading the aluminum hollow section. This thermal "short-circuit path" is provided immediately between the two closing components 60 and 70. With these means and the fact that with the gas-throughput embodiment depicted in FIG. 2 there are only provided longitudinal aluminum walls that correspond to the axial current variation of the system of channel aggregates, each of the longitudinal aluminum walls having a heat-dissipating thermal gradient (wall 52 of FIG. 1 to the free atmosphere with surface enlargement by providing fins thereon, wall 51 to the already cooler exhaust gas). All the walls causing the current reversal are directly exposed to vibration stress (i.e., all the transverse walls) are made from a material having a fairly high thermal stability. It is possible to utilize aluminum moldings in hot-gas zones lying above the known limits of thermal stability of this material, for its definition implies a thermal stress on all sides without the occurrence of a thermal gradient inside the wall area with an inevitably well-ordered heat dissipation.

Since there are types of engines in which the amount of hot gas exceeds even the protected structural range of application in the manner described hereinabove, a series of protective measures must be taken in the design concept to compensate for this. A general solution for this problem is given with reference to FIG. 3. The amount of hot gas leaving the exhaust-gas inlet channel 1 enters an expansion chamber 2 having the following four characteristics:

(1) the closing components not only have inlet chambers with limited penetration depth such as the closing components 60 and 70 of FIG. 2, but the whole internal chamber 50 of both hollow sections, which are positioned on the intake portion 70 of the closing component (FIG. 3), is designed with a wall having high thermal stability (usually aluminum-coated sheet steel);

(2) a heat-insulating material (e.g. ceramic wool) is provided between the aforementioned wall and the aluminum wall 51;

(3) the intake amount of hot gas admission via a branch-current divider 12 forms what is known as an internal cooling pipe, the internal chamber 8 of which faces the free atmosphere with both openings; and (4) when there is a large throughput of exhaust gas, an air ejector 9, extending into the outlet pipe 7 of the equipment, increases the fresh-air throughput through the internal cooling piep 8. The burned gas then leaves the chamber 2 and is passed to the two closing components 60a and 60b, the walls of which radiate to the free atmosphere and only then to the aluminum-encased channel aggregates of the two hollow sections. Finally, the collector chamber 6 for the combustion products again has a short-circuit path for heat exchange, as earlier described with reference to FIG. 2; the substantially cooled exhaust gas supplies heat directly from the opposite wall portion of the exhaust-gas lines 1 and 2 of the outlet line 7.

Figure 4:
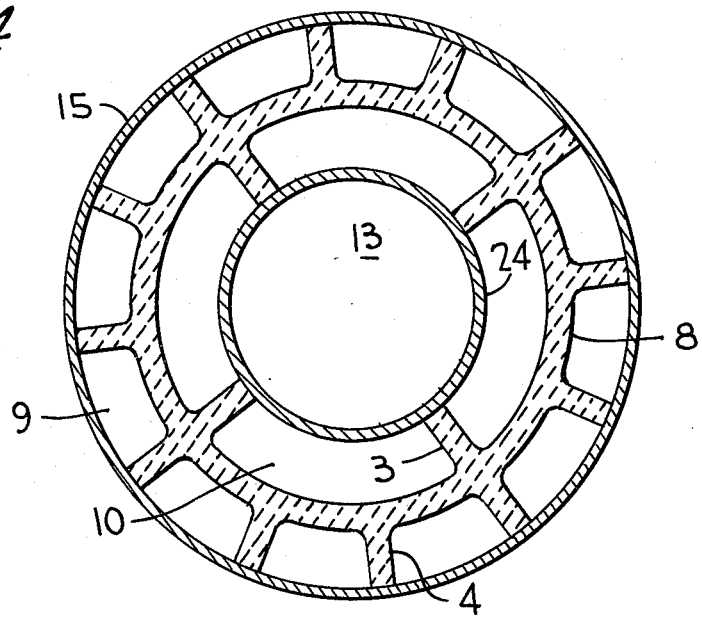
FIG. 4 is a cross section of a muffler with ceramic sections.
Figure 5:
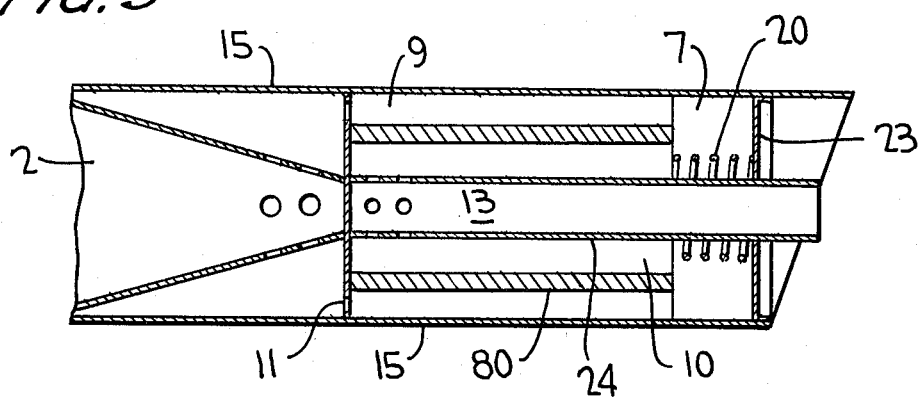
FIGS. 5 and 6 illustrate respective embodiments of improved sound-absorbing modules with hollow ceramic sections.
Figure 6:
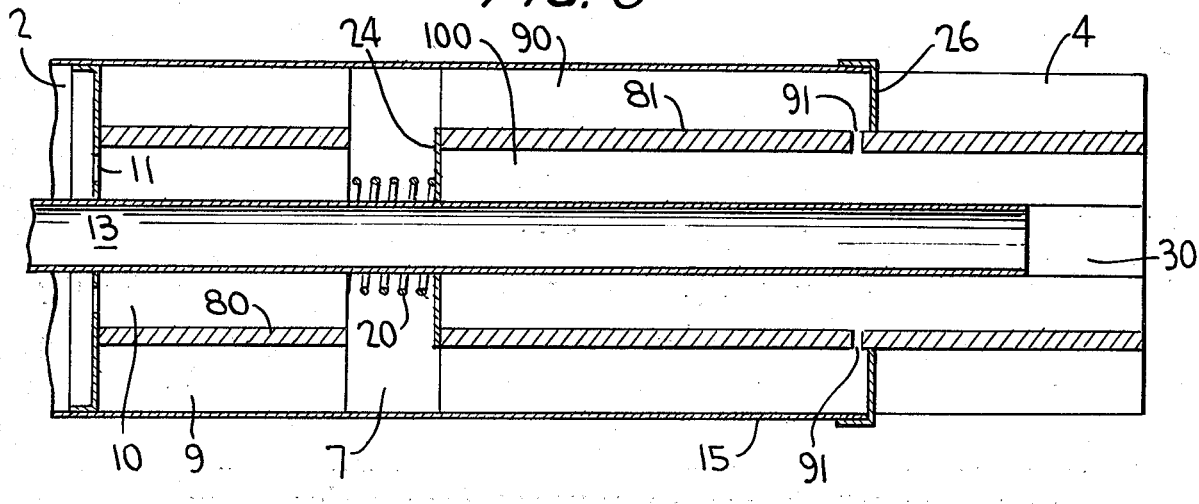

In exhaust systems of motorcycles, hollow sections of the type described hereinabove have a very special importance. FIGS. 4–6 show the possibility of replacing the usually high-wage acoustical elements of these mufflers by ceramic sections according to FIG. 4. FIGS. 5 and 6 show in connection with the closing components 11/23 (FIG. 5) and 11/24/26 (FIG. 6) improved sound-absorbing modules, the hollow sections of which are made from simple ceramic materials. The sections are retained by spring pressure 20. If hollow sections of aluminum are utilized, the production cost can be greatly reduced, if only because muffler trimming with chrome with an adequate layer thickness makes up about half the total production cost of such a system and this cost factor can be eliminated with the use of extruded aluminum parts, because the surface finish of the extruded moldings, in contradistinction to die-cast parts, is not inferior to chrome-plated systems even without any finishing. Moreover, the production of internal parts is less expensive and the extruded parts can be obtained from the manufacturer as a material sold by the meter and at the international price per kilo. Finally, an outer shell made up of hollow sections (FIGS. 9 and 10) is an effective means for eliminating solid-bound sound from two-stroke engines with a high power output per liter.

FIG. 7 describes a suitable type of construction for 4-stroke motorcycles which normally have long pipe tuning from the engine outlet. In FIG. 7, the long pipe—after traversing the internal chamber 50 of the hollow section (for example, as shown in FIG. 1, but without the external fins 56)—terminates in an expansion chamber 16 and directly impacts a cooling wall 21, which is a component part of a cooling-air throughput zone 14 operated with an air ejector 15, as earlier described with reference to FIG. 3.

FIG. 8 shows a muffler construction for two-stroke motorcycle engines up to about 100 cc. The countercurrent flow apparatus 18 is made also within the channel assembly 5 through an overflow slot 15; the burned gas flows out of the influx conus 1 through the perforations 18 into a first branch-current assembly comprising about ⅔ of all the channels, is passed in the expansion chamber of the rear closing component 19 to the second branch-current assembly, and is discharged from the equipment 13 via the resonator of the first closing component 12 and via an acoustical artificial coil. Large mufflers of two-stroke engines need a large-area aluminum encapsulation of the cylindrical wall portion 20 situated between the two cones 2 and 21. The gas escaping from the counterconus 21 through the holes 7 is passed from the chamber 8 to the branch-current assembly 14 shown in FIG. 10 to get to the terminal chamber 20 15 and the equipment outlet through the fully aluminum-encased branch-current assembly 12 via the chamber 15. The construction in FIG. 11 is similar to that in FIG. 9; a still simpler aluminum hollow section as shown in FIG. 12 guides the recycled gas by means of hollow fins 10 and the subsequent artificial coil pipes 17 to the equipment outlet.

In the construction of FIG. 13 the internal chamber 1 of the hollow section is utilized as an enclosed chamber for the electromotor 62 driving an air blower 61. Overflow slots 22 guide the air stream to a first branch-circuit assembly 2 and by means of the closing component 70 the air is passed to the second branch-current assembly 3, arranged in the counter-current flow apparatus. The closing component 60 also contains an optimally operating muffler 35/41/42/43. For electromotors such hollow sections are best made from aluminum, because the heat dissipation over the large enclosed surface is considerable.

FIG. 10 illustrates an aluminum hollow section wherein, in contradistinction to FIG. 1, the internal chamber 8 (50 in FIG. 1) also has a wall 11 radiating directly to the free atmosphere, despite the arrangement of branch-current channels in the area of the shell space 12.

In the integrated view of FIG. 14 the hollow section 90 shows a characteristic that extends it still further, namely, each branch-current channel, assemblies 91 and 92, and assemblies 93, 94, 95, and 96, like the internal chamber 50, include a single wall radiating directly to the free atmosphere, despite the fact that each of these longitudinal channels also has a double wall. Hence, the stability of this hollow section is considerable, and the construction of FIG. 14 shows how a thermal gradient can be assigned to each wall of this section by arranging the gas throughput by means of the closing components 60 and 70. In the internal chamber of the hollow section 90 there is provided a cylindrical double-wall section in accordance with FIG. 1, the internal chamber 50 of which is the continuation of an internal cooling tube 8 which also penetrates the two closing components as a cooling circuit completely separated from the exhaust-gas throughput. The construction of FIG. 14 shows the basic concept for terminal mufflers of automobiles. Here, too, there is no provision for aluminum bulkheads. The heat dissipation in the short-circuit path of the tube 8 is ensured not only by head wind, but also when the vehicle is at a standstill, that is to say, during the idle running of the engine, because the narrowed egress of the exhaust-gas current exerts an ejector action on the channels 5 for the air throughput from the internal orifices 50 of the hollow section. The clamping means pressing the closing components 60 and 70 against the hollow section and extending into the interior of the component is not shown.

In automobile mufflers, aluminum hollow sections may also be utilized for large displacements, if the gas charge, which drops thermally from the engine exhaust onward, has strictly (from the technical point of view) been carried out. Interestingly, this leads at the same time to a design concept known in multicylinder engines as "fan pipe" and in the case of so-called motor-racing systems (without all the so-called manifold designs) which consist of pipes of equal length opening into a manifold of a given length and cross section while being directly connected in parallel to the engine exhaust, because in this way the torque of an engine of specified construction can be optimally tuned. However, less known is the experience that can only be gained from test bed operations that optimal fuel consumption can be achieved with this type of "fan pipe" tuning. It is known from the works of H. List (1932, "Increasing the load factor by use of suction pipes in Diesel engines") and, at his instigation, the work of A. Pischinger (1935, "Motions in Gas Columns" in Forsch, a.d.G.d. Ing. Wesen, volume 6) and from many other later works that supercharging can be obtained through appropriate choice of the lengths and cross sections of exhaust lines and through proper design of the connected sequence chambers. Since those types of fan-pipe arrangements produce radiator-like radiation effects as well as very slight accumulations of materials, they may be utilized to achieve in the most economical way possible the required thermally dropping gas discharge. It is within the technological scope of this description that fan-type arrangements without preceding gathering manifolds with accumulations of casting materials followed by a gathering pipe line with an internal cooling system are deemed appropriate for the multicylinder four-stroke engine, from the engine outlet on.

On the other hand, H. Martins' concept in the fifties with an "expanded backpressure chamber" close to the engine and derived from acoustical theories, may be deemed as obsolete as the MAN AIR OX-system with inadmissible heat accumulation at the engine outlet, which still has not been written off everywhere as a post-combustion concept. The fan-pipe arrangement enabling a thermally dropping gas discharge is at the same time the appropriately thermally separating zone between primary-combustion and post-combustion systems. It is within the overall thermal concept of the gas discharge within the closing component over which the intake of gas in the designated hollow section takes place and it particularly extends, in conjunction with interposed or succeeding cooling pipelines the range of application of aluminum hollow sections or other materials that are sensitive to hot-gas stresses.

Figure 21:
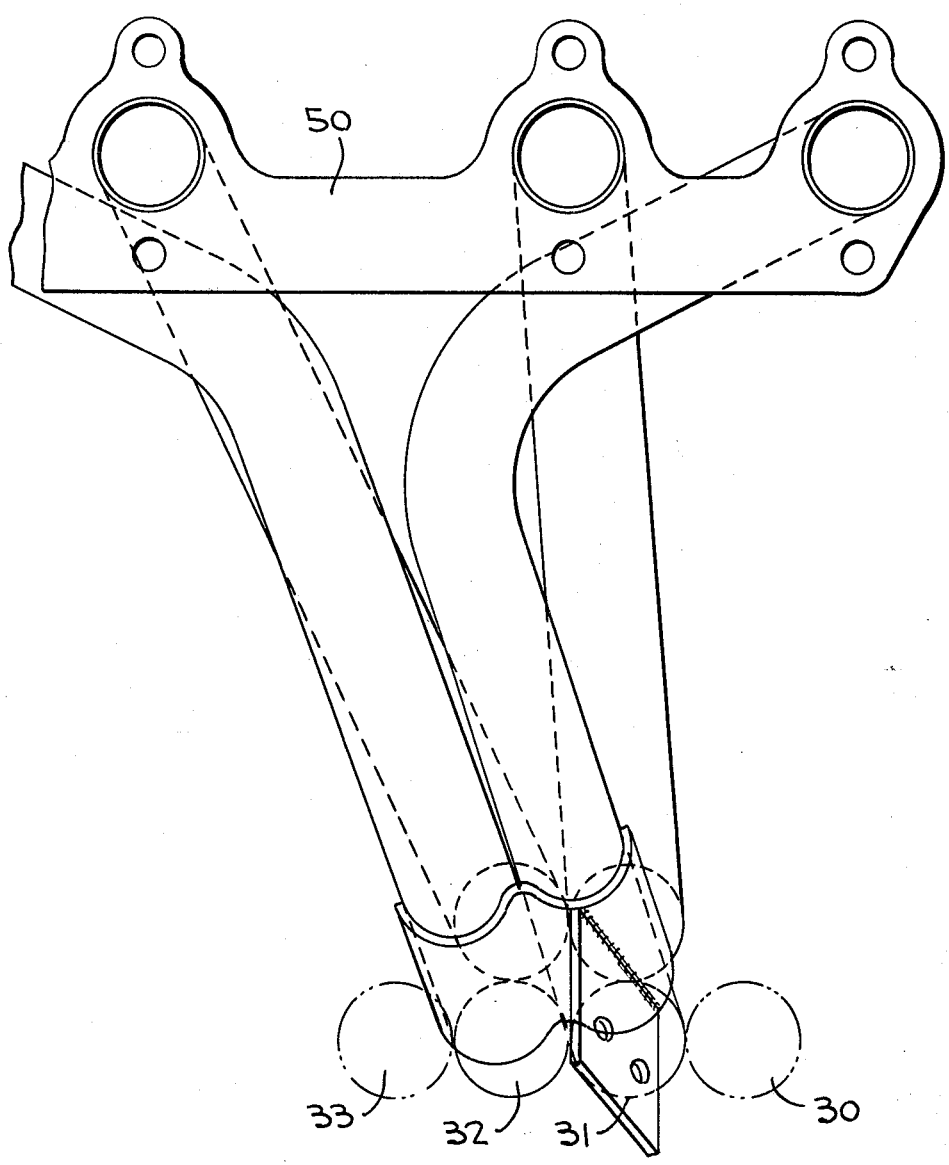
FIG. 21 shows a fan pipe arrangement.

FIG. 21 shows such a fan pipe which is connected via a wide flange 50 directly to the engine block without interposition of a casting which would first join the various exhaust outlets of a multicylinder cylinder. As is apparent from FIG. 22, these gases of the fan pipes 30–33 are first combined in the following expansion chamber designed at the same time as a cooling line by use of an internal cooling pipe 37. As shown in FIG. 23, it is advisable to move the exhaust-gas cooling line up into the fan-pipe area, e.g. with an enclosing air-throughput chamber 34, toward the engine outlets, as far as physically possible.

Figure 24:
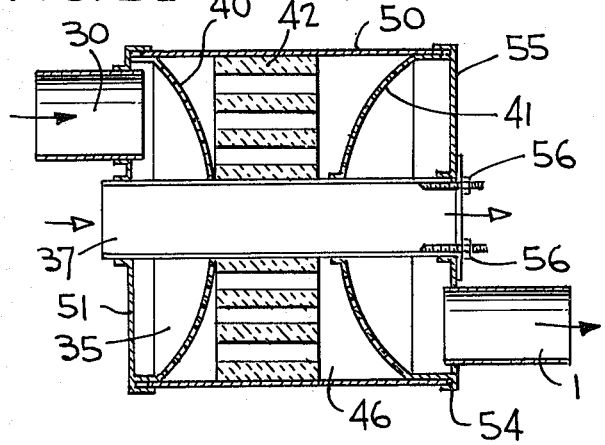
FIGS. 24 and 25 are cross sections of respective cooling lines of a pre-silencer type element.
Figure 25:
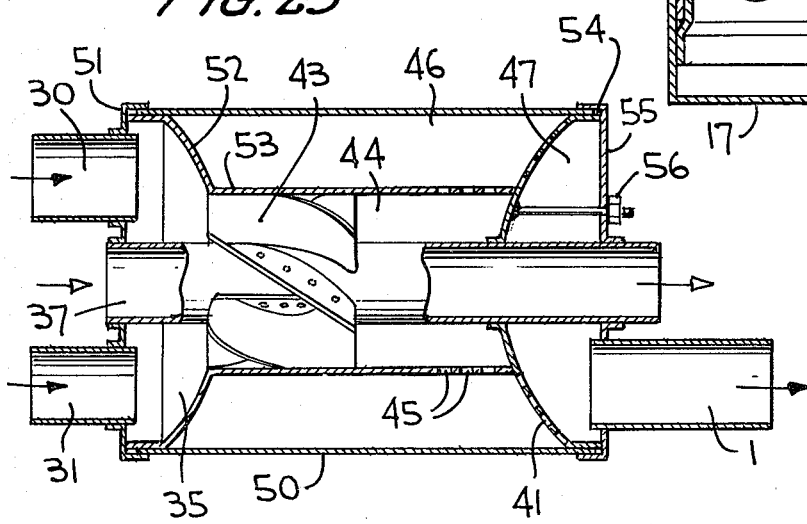

FIGS. 24 and 25 show two cooling lines which, owing to their highly active acoustical elements, are not only suitable as a so-called presilencer, but also conserve their own shell walls 50 prior to the formation of solidbound sound without requiring double walls with stuffed absorbents. Both are axially penetrated by an internal cooling pipe 37. Thus, the screwable lids 51 and 52 are free from vibration and have adequate strength for the strains exerted on the body by the intake 30, 31 and exhaust lines 1 in the various suspension modes. In both constructions the exhaust gas arriving through the line 30 or 30 and 37, as the case may be, undergoes initially a branch-current division; in the construction shown in FIG. 24, the division is through a sieve-shaped perforated plate 40; and in FIG. 25 it is after entry into the tubular gas-discharge chamber 53 by dispersion through guide blades 43 which are secured to the surface of the internal cooling pipe and also serve as torsion elements. The turbulent mixture of gas currents is passed through the array of perforated plates 45 to the chamber 46, and a pressure-wave reflection, which is significant for the selective effect of the structure, is caused by the guideblade areas and by the unperforated portion of the wall 41 closing the space 44. After another branch-current division (array of perforated plates 41) the gas is passed via the resonant chamber 47 to the line 1, which feeds it to the terminal muffler. This construction, including the cooling line disclosed in West German Unexamined Patent Application 26 25 616, substantially reduces the construction effort required for the terminal muffler. Due to the manifold heatexchange effects on the free atmosphere, it is advisable to use only metals as fabrication materials. The chrome-plated portion needed for the internal part 52/53/41 is small. The shell wall may consist of a single-sheet steel coated inside and out with aluminum, since there are no welded areas and the lids 51 and 55 are in gas-tight abutting engagement with each other by use of a sealing strip 54. In FIG. 24, a ceramic block is provided with a plurality of long channels 42. In spite of the similar effect, this construction is substantially less expensive.

All these examples point to the fact that a consistently thermally dropping gas discharge from the engine outlet to the closing component regulating the arrangement of the gas intake in the terminal muffler is capable of reducing the current resistance of the overall system, owing to the substantially limited gas expansion. Here, two constructively significant trends are combined: in addition to improved engine-power tuning, the possibility is afforded of utilizing materials that are sensitive to hot gas and that can be worked by use of an economical extrusion process. The construction element internal cooling pipe, also capable of being integrated into each branch current of the hollow sections as a cooling-air throughput separated from the exhaust gas by appropriate construction of the closing components, apart from the examples of FIGS. 3 (8), 6 (13), 7 (15), 14 (8 and 50), 17 (5), 19 (4 and 22), 20 (4 and 22), 22 (37), 24 (37) and 25 (37), must be adapted in the most economical way possible to all the applications, as far as its surface design is concerned.

Figure 19:
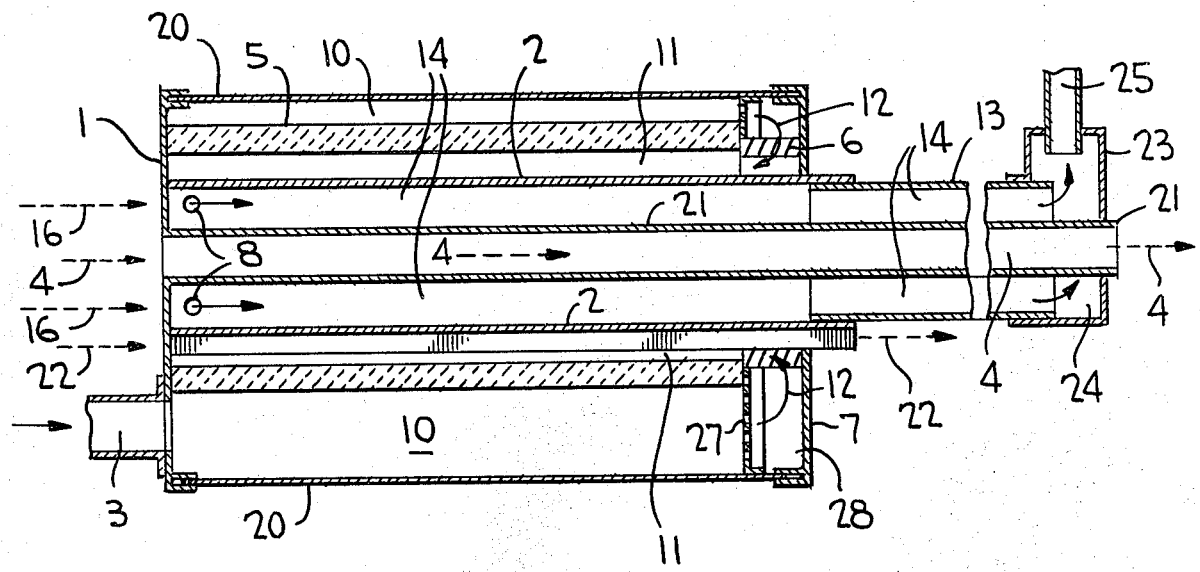
FIG. 19 shows an embodiment wherein multiple internal cooling pipes encase the internal exhaust-gas lines of a gas discharge apparatus.
Figure 26:
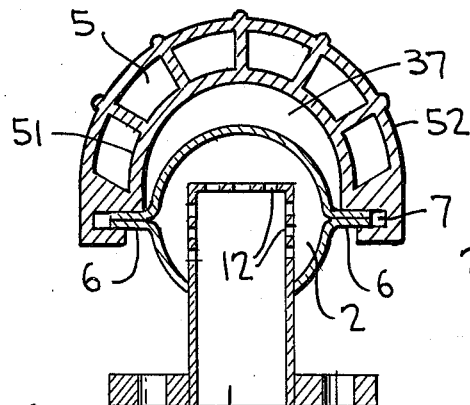
FIG. 26 shows an embodiment of an internal cooling pipe and extruded hollow section made of steel sheet.
Figure 27:
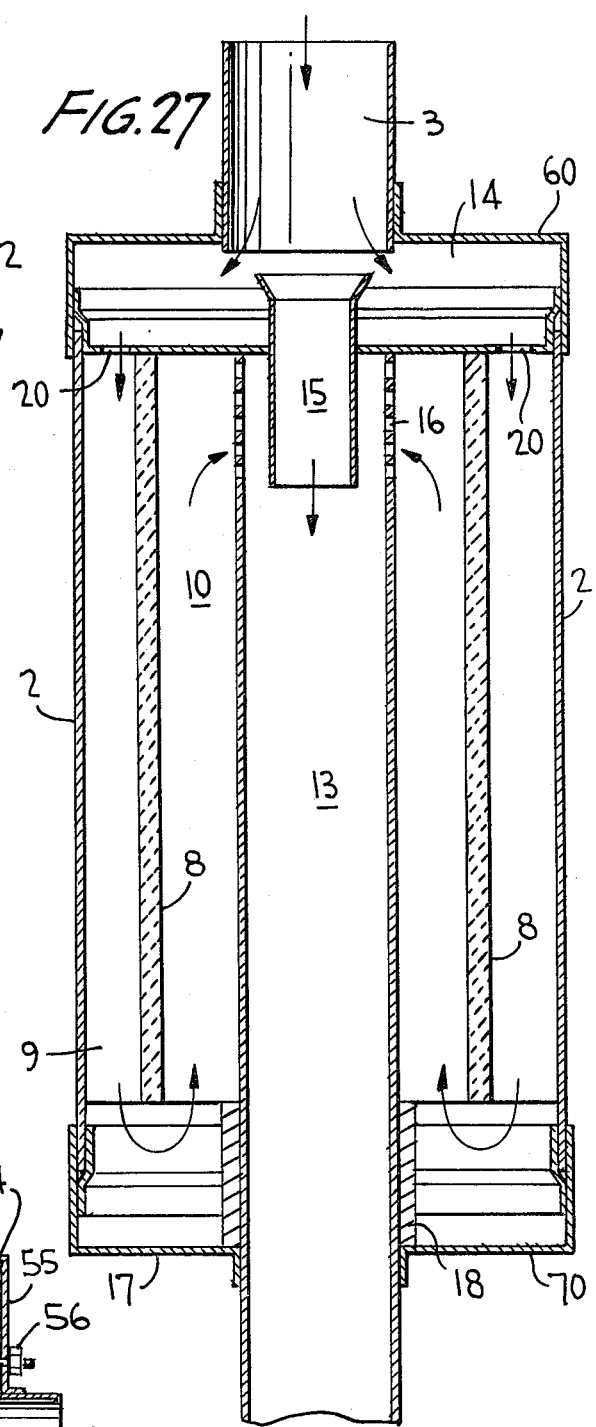
FIG. 27 shows an embodiment wherein the hot-intake gas zone covers a ceramic-covered heat sensitive metal wall of a gas discharge path.

In particular, both the internal cooling pipe and the combination—by use of the composite-casting process—of extruded hollow sections with sheet-steel parts which, for example, can be made in semimonocoque construction in accordance with the roll-spot welding process, can be fabricated in the manner shown in FIG. 26. The roll spot weld engages in a groove-like longitudinal recess of the hollow section 7. Whereas the construction of FIG. 3 brought about only an internal cooling of the hot-gas chamber 2 by means of the internal cooling section 8, in FIG. 24 an internal cooling of both the hot-gas inlet line (2 in FIGS. 14 and 26) and the internal walls 51 of the branch-current assembly is made possible in still another way, as already illustrated in FIG. 14. It depends on the gas-throughput sequence performed by the closing components (not shown in FIG. 26), whether the space 37 is utilized for the cooling-air throughput for the passing of the burned gas. If in FIG. 26 the hot-gas intake zone is situated at least partially outside the equipment 2, the construction of FIG. 3 already showed that there are considerations for providing them within the equipment. For such a construction, FIG. 27 shows a path of the thermal gas discharge which is similar to that of FIG. 19 in which the hot-gas intake zone, the annular space 10, thermally covers the heat-sensitive metal wall 2 by a ceramic wall 5. The ceramic hollow-section component roughly corresponds to FIG. 4, but the internal finning 3 (FIG. 4) would not be needed. The so-called thermal short-circuit path is only provided as a thermal gradient by wall scavenging on the other side, using a cooler medium (cf. FIG. 2: thermal flux from wall 17 toward exhaust closing components 18/19/72/73). In FIG. 27 there is a direct branch of a portion of the quantity of hot gas 3 as well through a short-circuit pipe 15 to the equipment outlet. Such construction is, for example, useful for presilencers. The remaining quantity of hot gas is passed to the expansion chamber 14 of the intake closing component 60, from there through a series of small openings 20 to the channel assembly 9 and the exhaust closing component space 70. In many cases, the external wall 2 may already be made of aluminum. The exhaust gas provided thereon and on the radiating wall 17 with heat loss flows over the gas-discharge chamber 10 to the outlet pipe 13 and a subpressure zone, which develops behind the array of holes 16 on account of the injector-like short-circuit pipe 15 to produce suction effects. The arrangement of a "short-circuit pipe" 15 axially, and at a short distance, from the inlet pipe 3 is advantageous, because with such a simple construction the internal hot core of the gas column 3 is eliminated and is kept away from a heat-sensitive aluminum wall (outer wall 2).

FIG. 28 illustrates further improvements of this thermal "short-circuit system" through interposition of acoustical components (15/16/17), the combination of the equipment outlet with the internal cooling-pipe system, and through the special design of a thermally cooling gas discharge apparatus in the event that pipeline paths in particular are formed partly by walls of aluminum and partly by non-metallic hollow pieces 8, with the ceramic internal part as a rule corresponding to the cross section of FIG. 4.

The system of the thermal gas discharge also shows with these examples the development of new acoustical components using various materials fabricated in accordance with the composite-casting process; a presilencer construction in accordance with FIG. 27 realizes the frequency reduction particularly necessary in this position of a gas-exhaust system, without building flow resistances. That solid-bound sound of two-stroke gas-exhaust systems in engines having a fairly high output per 1000-cc cylinder capacity can be controlled even at extremely great savings without the expensive and heavy double walls with rock-wool interlayers, as in pure sheet-steel manufacture, is of particular advantage from the point of view of the composite-casting process. As a rule, the closing components are made from a single cover. It is possible to clamp them gastight.

The application also extends to the partial or full encapsulation of engines as a whole, insofar as there is a gas throughput in the enclosed space resulting from the operation of the engine (internal combustion engines, throughput of combustion products, cooling air or induction air), or is directly related to the motor drive (air feed by means of electromotors).

What is claimed is:

1. An exhaust gas muffler apparatus, comprising:
   exhaust gas intake means for receiving hot exhaust gases from an engine;
   an expansion chamber communicating with said exhaust gas intake means and including a first wall member having at least one aperture therein;
   an exhaust expansion chamber including an exhaust gas outlet tube for exhausting cooled exhaust gases to the atmosphere;
   a plurality of first elongated channels each having a first inlet and a first outlet and extending between said first wall member and a first region adjacent said exhaust expansion chamber, the first inlets being interconnected with said at least one aperture and each of the first outlets opening into said first region, and said plurality of first elongated channels having at least one outer wall member exposed to the atmosphere;
   at least one second elongated channel having a common wall with respective walls of said plurality of first elongated channels and a second inlet and second outlet, said second inlet being interconnected with the first outlets, and said second outlets opening into a second region adjacent said wall member;
   an exhaust gas tube extending between said exhaust expansion chamber and said first region and having a wall member common to said second elongated channel; and
   a plurality of fins extending from the common wall of said elongated second channel through said at least one outer wall member into the atmosphere, said plurality of fins together with said at least one outer wall member and the common wall of said elongated second channel, forming said plurality of first elongated channels.

2. An exhaust gas muffler as in claim 1 further comprising additional fins extending from said at least one outer wall member with at least one of said additional fins interposed between the portions of said fins extending into the atmosphere.

3. An exhaust gas muffler as in claim 1 further comprising an intake chamber at each first inlet and first outlet of said plurality of first elongated channels, the intake chambers at each first inlet communicating with said at least one aperture, and the intake chambers at each first outlet having a common wall with said exhaust expansion chamber and an outlet communicating with said second inlet.

4. An exhaust gas muffler as in claim 1 further comprising fastening means engaging said wall member and an outer wall of said exhaust expansion chamber and extending through said exhaust gas tube for retaining said expansion chamber, said plurality of first elongated channels, said at least one second elongated channel and said exhaust expansion chamber.

* * * * *